United States Patent Office 3,312,294
Patented Apr. 4, 1967

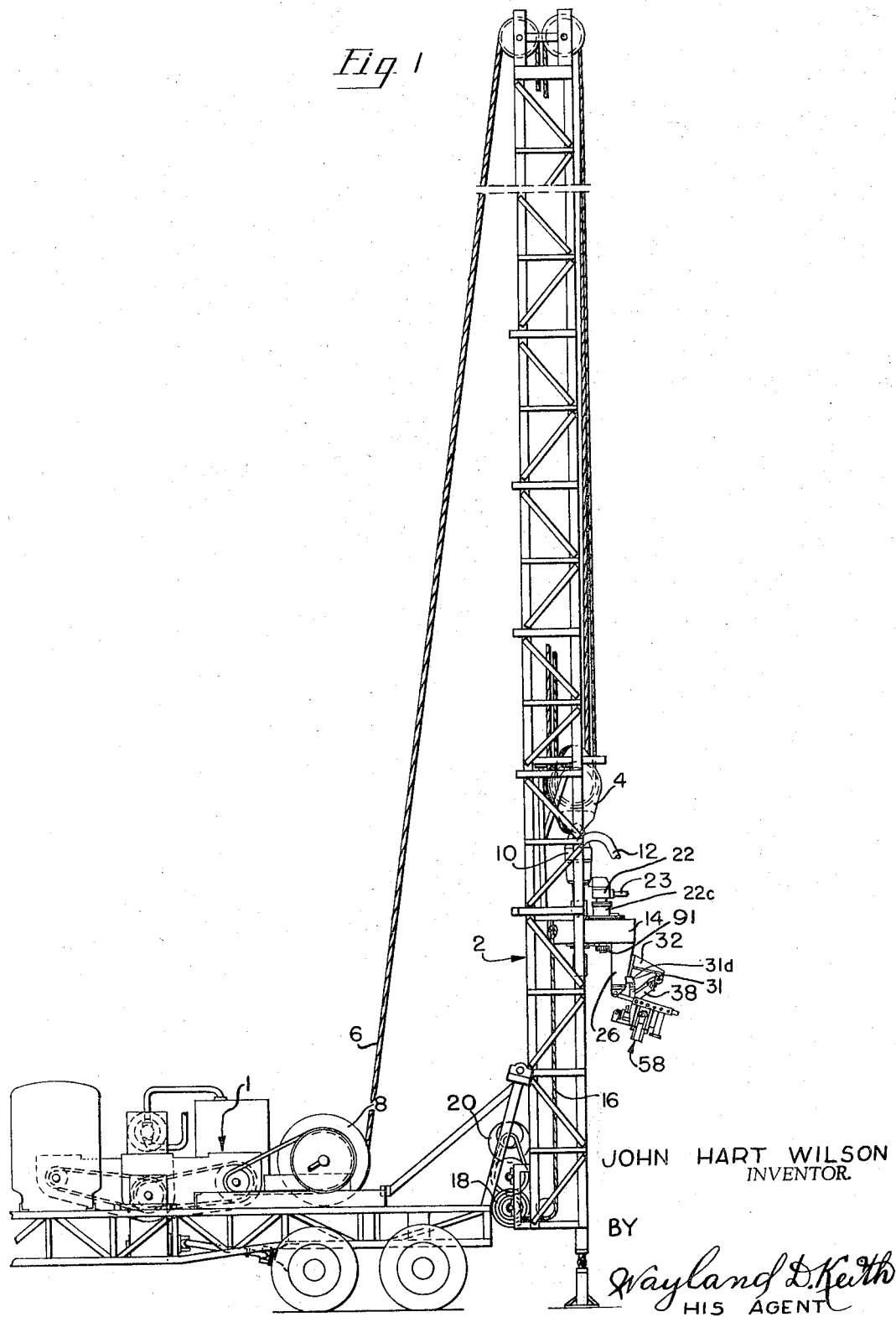

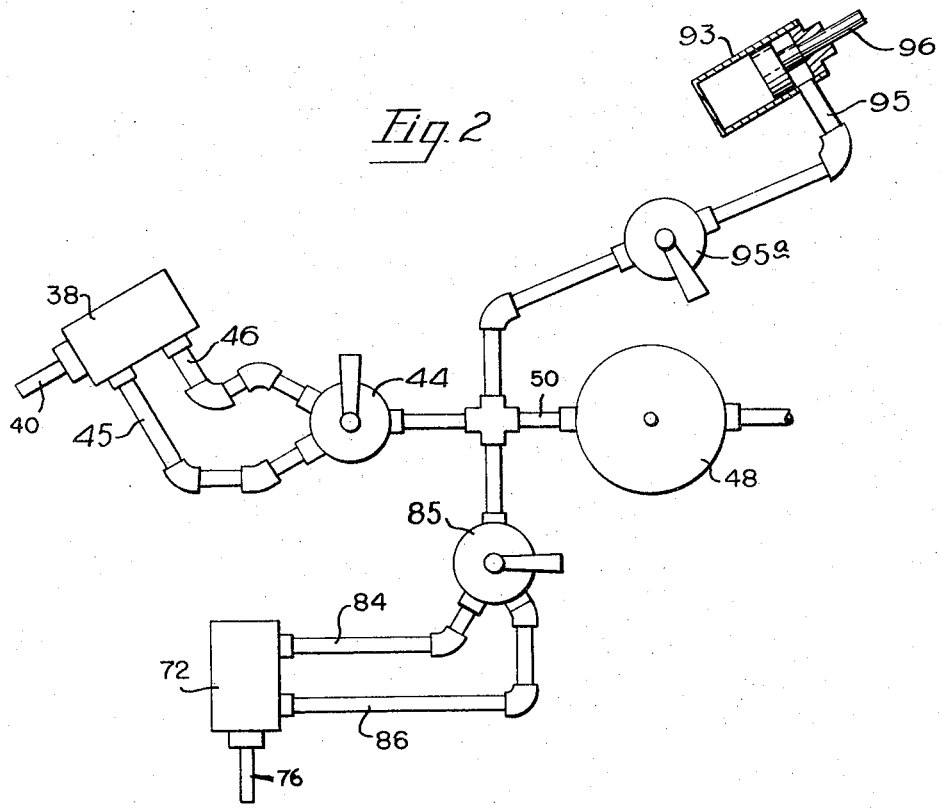
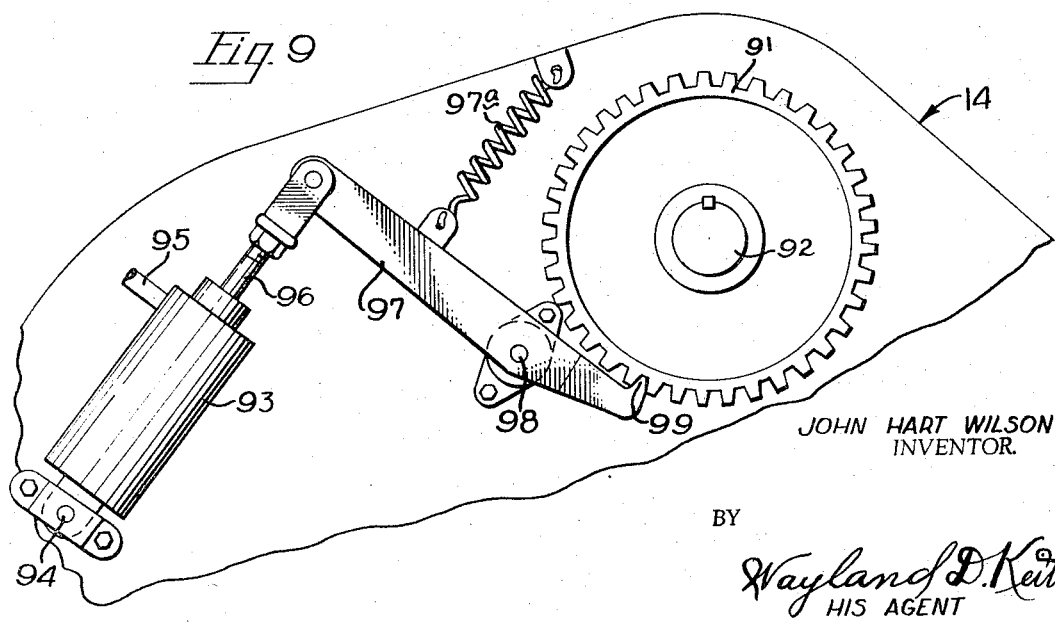

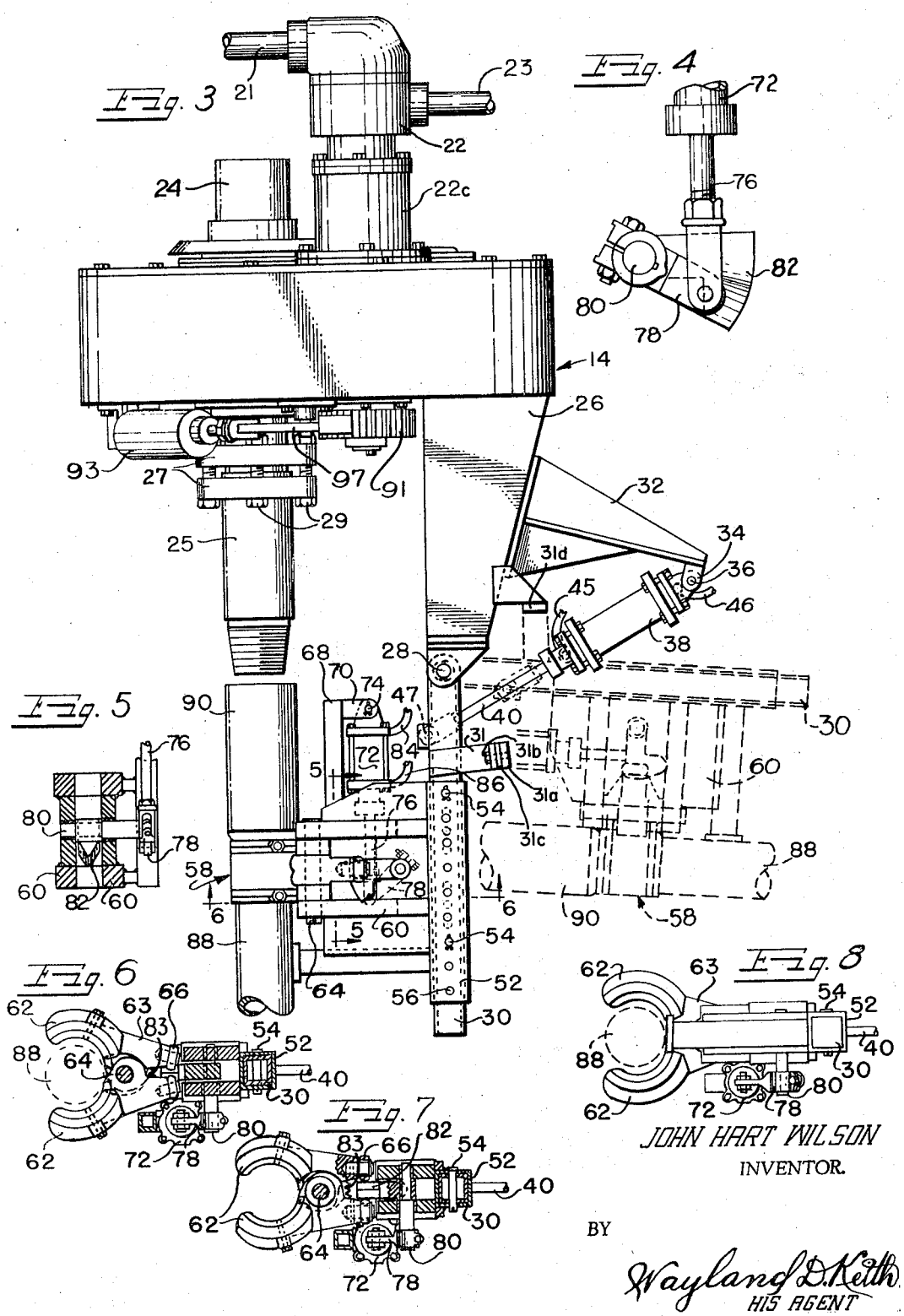

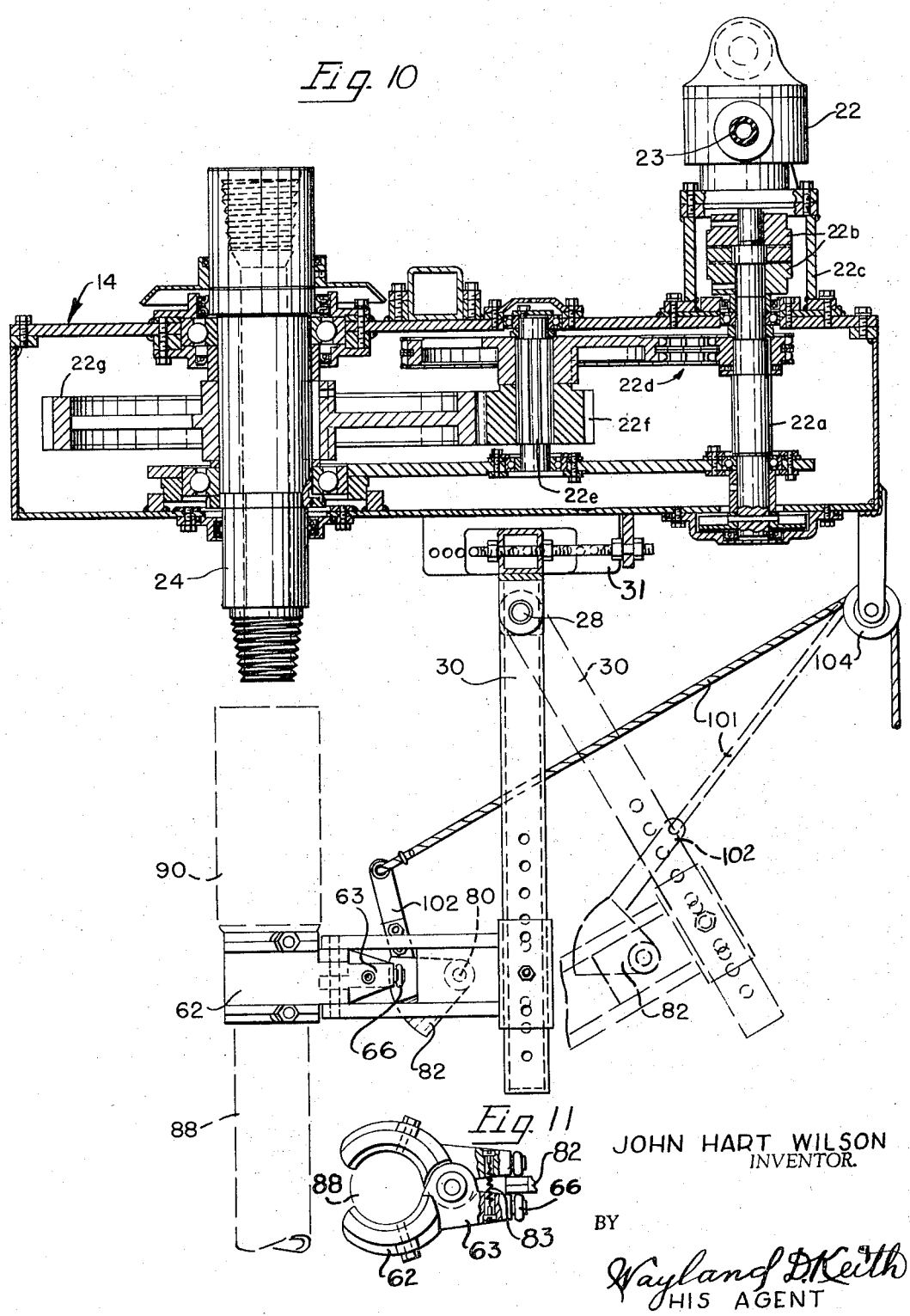

3,312,294
PIPE HANDLING DEVICE
John Hart Wilson, c/o Wilson Manufacturing Co., P.O. Box 1031, Wichita Falls, Tex. 76307
Filed Aug. 4, 1964, Ser. No. 387,459
13 Claims. (Cl. 173—164)

This invention relates to improvements in pipe handling devices and more particularly to pipe pick-up devices which enable a length of pipe or drill stem to be readily picked up from a prone position and moved into an upright position to enable the length of pipe to be screwthreaded onto a power sub, spinning device, or the like, and lowered into the bore hole of a well.

It has been the general custom heretofore to pick up lengths of pipe from a prone position, with a cat line, and to set these in a "mouse hole," then, when the pipe was needed to proceed with the drilling of the bore hole of the well, the lower end of the Kelly joint was positioned thereabove and screwed thereonto, whereupon, the pipe was moved into the bore hole of the well and screwthreaded onto the pipe in the well, to the desired tightness, by means of tongs.

The present pipe handling device, which is mounted on a power driven sub, enables the device to be attached to a length of pipe, while the pipe is in prone position, and enables the pipe to be moved into upright position when going into the bore hole with the pipe, and by utilization of the power driven sub, the length of pipe may be suspended in upright position above another length of pipe which is suspended in the bore hole of the well. The power sub is again actuated to screw the length of pipe suspended therefrom onto the length of pipe suspended in the bore hole of the well, with the threaded joints of each being tightened simultaneously. The present operation can be accomplished with one or two workmen.

In coming out of the hole with pipe, a length of pipe may be withdrawn until the joint therebelow can be gripped with pipe engaging slips. With the pipe in this position, torque may be applied with manual or power actuated tongs to break the threads of the joint, then the power sub may be utilized to spin out the pipe, once the threads have become loosened. When the pipe joint is unscrewed, the length of pipe may be moved outward onto a dolly or onto other means to support the distal end thereof, then by lowering the traveling block, the lower end of the pipe may be moved outward until the pipe is in prone position. With the pipe in prone position, a cam on the handling device may be actuated, which will open the grippers to permit removal of the pipe gripping elements from the pipe, whereupon, the traveling block is moved into position to engage successive lengths of pipe for removal from the well in the same manner.

It is preferable to have the power sub or pipe rotating device movable longitudinally of and in guided relation within a mast or derrick so that the pipe gripper, which is attached to the power sub, will move into position to grip the pipe substantially in the same manner each time. In this way, the man or men on the platform of the drilling rig, or on the ground can guide the grippers onto the pipe, and, by manipulation of a valve within the fluid conduit leading from a pressure source to a fluid cylinder, the fluid cylinder will be actuated to cause a cam on the pipe handling device to move, thereby actuating the grippers to grip the pipe in such manner that, when it is moved from prone position to an upright position, the joint of pipe or length of drill stem will swing below the power sub and be in axial alignment therewith, then by moving the power sub and the traveling block upward, until the length of pipe is directly above the center of the bore hole, the length of pipe may be readily lowered into place to enable adjacent joints to be screwed up simultaneously by a motor driven pipe spinning device, or by a device which is generally known as a power sub or power swivel.

An object of this invention is to provide a pipe lifting device which will enable pipe to be lifted from a prone or lying down position into an upright position.

Another object of the invention is to provide a pipe gripping and handling device which is power actuated and which will enable a length of pipe, such as drill stem or the like, to be gripped, while in a substantially horizontal position, and be moved into an upright position, which pipe gripping device can be disconnected by power means.

Still another object of the invention is to provide a pipe handling and power gripping device, the jaws of which are actuated by a power cylinder which is remotely controlled by an air valve within a fluid system.

Still another object of the invention is to provide a pipe handling and power gripping device for pipe, which will not open if the fluid power is unintentionally released.

Another object of the invention is to provide a pipe handling and pipe gripping device which is readily adjustable for various lengths of tool joints and the like.

Yet another object of the invention is to provide a pipe handling and pipe gripping device which is simple in construction, easy to manufacture, low in cost, and relatively trouble free in operation.

Still another object of the invention is to provide a pipe handling device which is supported by a power sub which will move the drill stem or tubing from a substantially horizontal position to a vertical position so that the lower, screwthreaded end of the tubular member of the power sub will be axially aligned with the drill stem or tubing supported by the pipe handling device, and with the drill stem or tubing supported in a well so that, upon lowering the power sub, the screwthreaded connection of the lower end of the drill stem or tubing will seat on the threaded portion suspended in the bore hole of the well and the screwthreaded tubular member of the power sub will move into engagement with the screwthreaded joint on the upper end of the drill stem or tubing so upon rotation of the power sub, the screwthreaded joint on each end of the supported drill stem or tubing will be simultaneously tightened.

With these objects in mind and others which will become manifest as the description proceeds, reference is to be had to the accompanying drawings in which like reference characters designate like parts in the several views therein, in which:

FIG. 1 is a fragmentary side elevational view of a portion of a draw-works of a mobile drilling rig, showing a mast hingeably connected thereto, and showing the present invention mounted on the mast and being operatively connected therewith;

FIG. 2 is a diagrammatic view of the fluid actuating system of the pipe gripping device;

FIG. 3 is a side elevational view of a pipe sub showing the invention installed thereon in full outline and in dashed outline, with the full outline position showing the pipe gripper and length of pipe in an upright position and the dashed outline position showing the gripper and a fragmentary length of pipe, with the pipe in prone position and showing an air compressor, a fluid conduit system, and a fluid control valve to actuate a fluid cylinder thereon;

FIG. 4 is a fragmentary view of a portion of a hydraulic cylinder which actuates a holding cam member;

FIG. 5 is a fragmentary sectional view taken on the line

5—5 of FIG. 3, looking in the direction indicated by the arrows;

FIG. 6 is a sectional view taken on the line 6—6 of FIG. 3, looking in the direction indicated by the arrows;

FIG. 7 is a view similar to FIG. 6 but with the jaws shown in closed position and showing portions broken away and portions shown in section to bring out the details of construction;

FIG. 8 is a bottom plan view of the device with the jaws thereof being shown in open position, showing a length of pipe, in dashed outline, positioned between the jaws;

FIG. 9 is a fragmentary view of a portion of the bottom of a power sub, showing the locking mechanism therefor;

FIG. 10 is an elevational view, with parts shown in section, of a power sub, showing an alternate form of pipe handling device attached thereto, the pipe handling device being shown in full outline in position to hold the pipe axially aligned with the tubular member of the power sub, the released position of the pipe handling device being shown in dashed outline, and FIG. 11 is a top plan view of the pipe grippers, with portions thereof being broken away and shown in section.

With more detailed reference to the drawings, the numeral 1 designates generally a drilling rig of the mobile type, which has a mast or derrick-like structure 2 pivotally connected thereto for moving from a horizontal position to an upright position for drilling wells deeper, working over a well and for well servicing work. The present arrangement provides a traveling block 4 which is adapted to move within the derrick or mast 2 in guided relation by one or more lines to take the torque. The traveling block is raised and lowered by a cable 6 which is wound onto a hoisting drum 8, as is well understood in the art of rotary drilling.

A fluid swivel 10 is connected to the lower end of traveling block 4 and has a hose 12 extending therefrom to a suitable pump (not shown) for directing fluid thereinto in a manner well known in the art of drilling. The swivel 10 is connected to a power sub, designated generally at 14, so that the traveling block 4, swivel 10, and power sub 14 all move as a unit as the cable 6 raises and lowers the traveling block 4. The present arrangement provides for moving the traveling block, the swivel, the power sub and the pipe handling device as a unit, in guided relation by a trackway within the confines of a mast, or guided by a torque cable longitudinally associated with a derrick. A power operated pull down device, such as a cable or chain 16 may be attached to a winding drum 18, which winding drum is connected in geared relation with a power unit 20, such a hydraulic motor or the like.

The power sub 14 is of a character disclosed generally by a co-pending application, Ser. No. 225,666, filed Sept. 24, 1962, now Patent No. 3,191,450, dated June 29, 1965. The present device utilizes a motor 22, to rotate shaft 22a in power sub 14, which shaft is connected to motor 22 by shaft coupling members 22b within housing 22c. The shaft 22a is connected, through a sprocket and chain system 22d, in geared relation to a shaft 22e, on which shaft a gear 22f is fixedly connected. The gear 22f is in gear reduction, meshed driving relation with a gear 22g which is fixedly secured to a hollow pipe 24, which gearing arrangement rotates the hollow pipe 24, which passes transversely therethrough. The power sub 14 has a downwardly extending bracket 26 on a side thereof, which bracket is apertured near the lower end thereof to receive a pivot pin 28 therethrough, to which pivot pin an arm 30 is pivotally connected so as to move from the position as shown in full outline FIG. 3, to the position shown in dashed outline therein. An outstanding bracket 32 on bracket 26, on the housing of the power sub 14 has apertured lugs 34 on the distal end thereof by which a pivot pin 36 pivotally mounts a fluid cylinder 38, which has a plunger 40 slidably mounted therein. The plunger 40 is pivotally connected, by pin 47, to arm 30 so as to swing the arm 30 through an arcuate movement from the full outline position to the dashed outline position, as shown in FIG. 3.

The arm 30 has a laterally extending bracket 31 thereon which has a bumper 31a secured thereto by means of a bolt 31b. A shim 31c is positioned intermediate the laterally extending bracket 31 and the bumper 31a to form an adjustable stop means to permit adjustment of the effective length of the laterally extending bracket and bumper assembly 31–31a. An abutment 31d is mounted on downwardly extending bracket 26 so, when arm 30 extends from the position as shown in full outline in FIG. 3 to that shown in dashed outline therein, the upward pivotal movement of the arm 30 will be limited, as indicated in dashed outline in FIG. 3 and in full outline in FIG. 1.

Upon manipulation of a fluid control valve 44, fluid under pressure is selectively directed to one end of the fluid cylinder 38, through pipe 45, and fluid is directed therefrom, through pipe 46 and valve 44 to be exhausted in a manner well understood in the art of pneumatic fluids. An air compressor 48 is provided within the fluid conduit system 50 to supply pressure, such as air pressure, to the system.

The arm 30 has a sleeve 52 telescoped thereover, which sleeve is held in adjusted relation with respect to arm 30 by pins 54 which pass through apertures in the sleeve and in the arm 30 when the apertures are in register. The apertures are designated by the numeral 56 and are so spaced as to give a Vernier adjustment to the pipe engaging members, designated generally by the numeral 58. A support frame 60 is mounted on the side of sleeve 52 and extends outward toward the axis of hollow pipe 24. A pair of arcuate pipe engaging members 62 are pivotally mounted on support frame 60 by a pivot pin 64. The arcuate pipe engaging members 62 have the opposite ends thereof extending toward sleeve 52, and each has a roller 66 journaled thereon, which rollers are spaced apart, the axes of which rollers lie in a plane perpendicular to the axis of the pipe.

The support frame 60 has an upstanding bracket 68 secured on a side thereof, which bracket has outstanding apertured lugs 70 thereon to pivotally mount, by pivot pin 74, a fluid actuated cylinder 72. The fluid actuated cylinder 72 has a downwardly extending plunger 76 pivotally connected to an arm 78 mounted on a cam shaft 80. The cam shaft 80 has a cam 82, a part of which cam is wedge-shaped and a part thereof has flat-faced parallel sides, mediate support frame members 60. When the plunger 76 is in the uppermost position, the arm 78 is in a raised position, which disengages the cam 82 from rollers 66. A spring 83 is resiliently associated with the arcuate pipe engaging members 62 to normally urge these members into open position, as shown in FIG. 6.

Upon actuation of valve 85, fluid will be directed through conduit 84 to move plunger 76 downward and the fluid will be exhausted through conduit 86. With the plunger 76 moved to the lowermost position, as shown in FIGS. 3 and 7, the arcuate pipe engaging members 62 will surround a length of pipe 88, below a tool joint connection 90, whereupon, the wedge-shaped portion of the cam 82 will move between rollers 66, which will urge the rollers 66 apart, which will cause the arcuate portion of the pipe engaging members 62 to grip the pipe, then, upon further movement of the cam 82 by plunger 76, the cam will be urged between the rollers 66 until the flat-faced parallel sides of the cam hold the rollers 66 in spaced apart relation to rigidly hold the pipe, even though fluid pressure is not maintained on cylinder 72, so when the pipe is raised from a position as indicated in dashed outline in FIG. 3, the arm 30 and pipe engaging members 58 will swing about pivot pin 28 to move the length of pipe 88 from a prone position, as shown in dashed outline in FIG. 3, to the full line position as shown therein. When the pipe is moved into this position, the screwthreaded joint on hollow pipe coupling 25 engages a screwthreaded joint within tool joint connection 90 to enable the pipe to be rotated by the power sub 14.

The hollow pipe 24 has a coupling 25 screwthreaded onto the lower end thereof, which screwthreaded coupling usually has right hand threads, however, since the power sub 14 will be driven alternately in right and left hand directions, set collars 27 will be secured to the respective lengths of hollow pipe 24 and to the pipe coupling 25, so that parallel holes therein will register with holes in the other set collar, which holes are circumferentially spaced at intervals around the respective collars, and will be in aligned relation to receive bolts 29 through the respective holes, which will maintain the pipe coupling 25 against becoming unscrewed from hollow pipe 24.

The hydraulic motor has conduits 21 and 23 leading therefrom so that the hydraulic motor 22 may be driven in either direction to rotate hollow pipe 24 in the desired direction. A source of hydraulic power (not shown) is connected to conduits 21 and 23 to provide the necessary fluid pressure thereto.

*Alternate form of invention*

The form of the invention, as shown in FIG. 10, employs a rope or cable 101, which is connected to an apertured lever or ear 102 on the cam 82, to rotate the cam 82 about the axis of shaft 80, which shaft is journaled in frame 60. The frame 60 is mounted on the arm 30, which arm 30 is pivoted on a pin 28 on lug 31 which extends downwardly from the lower side of power sub 14.

A pulley 104 is mounted on the power sub, designated generally at 14, and the rope or cable 101 passes over pulley 104. The rope or cable 104 is of sufficient length to extend to the operator position, when the pipe 88 is swung into axial position above a similar joint of pipe or drill stem in the well, whereupon, as the pipe is lowered into place, and the tubular member 24 positioned thereabove is lowered and screwed into threaded engagement with the box portion of the tool joint 90, the rope or cable 101 may be pulled, which will rotate cam 82 from between arms 63, which arms are integral with pipe engaging members 62, which members are pivotally mounted on frame 60. The arms 63 extend in the opposite direction from pivot pin 64, which arms mount the respective rollers 66 thereon. This movement of the cam 82 will permit the arcuate pipe enegaging members 62 to move into open pisition, as shown in FIG. 6, and the arcuate pipe engaging members 62 and arm 30 will swing from the position as indicated in full outline in FIG. 10 to the position as shown in dashed outline therein. With the pipe handling device in this position, the rotation of drill stem or pipe 88 may continue until the bore is drilled to a depth equal to the length of the pipe, whereupon, the tubular member 24 is unscrewed from the box portion of tool joint 90 and another length of pipe is picked up from a substantially horizontal position and is moved into place as set out above.

In coming out of the bore hole, the pipe handling device may be moved beneath the end of the box of tool joint 90, then the lever 102 is moved from the position as shown in dashed outline in FIG. 10 to the full line position as shown therein. In so doing, the wedge portion of the cam 82 will move between rollers 66 until the arcuate pipe engaging members 62 surround the pipe or drill stem 88 below the tool joint 90, then, as the cam is moved about the axis of shaft 80, the rollers 66 will move onto the parallel plane surfaces on the upper portion of the arcuate cam 82, which will prevent movement of the arcuate members 62 while the drill stem 88 and tool joint 90, which is screwthreaded onto the threads of tubular member 24, are withdrawn from the bore hole of the well to such extent that a length or lengths of drill stem extend above the top of the well, whereupon, conventional slips grip the pipe below the length or lengths of pipe or drill stem, and the hydraulic motor of the power sub 14 is utilized to rotate the tubular member 24 to unscrew the tubular member 24 from the box of tool joint 90, whereupon, the power sub is lowered in the manner as disclosed in FIG. 1, and the length of drill stem 88 may be laid down in a conventional manner. Then the lever 102 may be utilized to manipulate cam 82 to permit the arcuate pipe engaging members 62 to spread apart, whereupon the above procedure is repeated until the pipe is withdrawn from the bore hole of the well.

The pipe rotating device 14 has a spur gear 91 mounted on the lower end of motor shaft 92, which spur gear 91 is keyed to the shaft 92 to prevent relative rotation therebetween. A cylinder 93 is pivotally mounted on pivot pin 94 on the lower side of the pipe rotating device 14 and has an air conduit 95 which leads from tank 48 to one end of air cylinder 93. A three-way valve 95a is within conduit 95 to control the flow of air into the cylinder 93 and the release of air therefrom, which air actuates the piston and plunger assembly 96 which plunger 96 is pivotally connected to a lever 97. The lever 97 is further pivoted to the lower side of pipe rotating device 14, by pivot pin 98, so upon actuation of a lever 97, pivotally mounted on pivot pin 98, in one direction, a tooth 99 on the end of the lever 97 will engage between teeth of spur gear 91. When operated in the opposite direction between the teeth 99 will disengage from the tooth of gear 91, for free rotation of motor shaft 92 and spur gear 91. A spring 97a is secured to the lower side of the housing of pipe rotating device 14 and to the lever 97 so as to normally urge the tooth 99 out of engagement with the teeth of spur gear 91. However, when it is desired to engage the tooth 99 with the teeth of spur gear 91, the valve 95a is actuated to direct air from an air compressor 49 which forms the source of air supply, through conduit 95 into cylinder 93, which will move the piston and plunger assembly 96 into the cylinder 93 and move the lever 97 against tension of spring 97a so as to lock the motor shaft 92 against rotation, thereby enabling the holding of hollow shaft 24 against rotation to enable the drill stem 88 to be unscrewed from the lower end of screwthreaded connection of coupling 25, thereby enabling the device to be used both to make up and to break out pipe and to hold pipe against turning, while a tonging action is used to loosen the pipe from the screwthreaded coupling, as set out above.

Having thus clearly shown and described the invention, what is claimed as new and desired to be secured by Letters Patent is:

1. A pipe handling device for use in combination with a drilling rig, which drilling rig has an upright tower with a traveling block, a swivel, and a pipe rotating device depending therefrom, which pipe handling device comprises;
 (a) a bracket mounted on the pipe rotating device for movement by the traveling block,
 (b) an arm pivotally mounted on said bracket,
 (c) a support frame mounted on said arm,
 (d) a pair of arcuate pipe engaging members pivotally mounted on said support frame, with the axis of the pivot being substantially parallel to the axis of said arcuate pipe engaging members,
  (1) an arm extending in the opposite direction from each arcuate pipe engaging member,
  (2) a roller journaled on each said arm near the end thereof opposite each arcuate pipe engaging member,
 (e) a cam, a portion of which cam has spaced apart parallel faces and a wedge-shaped portion associated with a side thereof, which cam is pivotally mounted on said support frame to actuate said arcuate pipe engaging members,
  (1) said cam being adapted to move between said rollers to positively close said pipe engaging members, when said cam is in one position, and to permit said pipe engaging members to open when said cam is in another position, and (f) operator means operatively associated with said cam to pivotally move said cam by remote control.

2. A pipe handling device for use in combination with a drilling rig, which drilling rig has an upright tower with a traveling block, a swivel, and a pipe rotating device depending therefrom, as defined in claim 1; wherein
(a) said operator means is a fluid system comprising,
(1) a fluid actuated cylinder operatively associated with said support frame and with said movable cam,
(i) a conduit for supplying fluid under pressure to said fluid actuated cylinder, and
(ii) a control valve within said conduit to selectively control pressure to said fluid actuated cylinder.

3. A pipe handling device for use in combination with a drilling rig, which drilling rig has an upright tower with a traveling block, a swivel and a pipe rotating device depending therefrom, as defined in claim 1, wherein:
(a) said operator control means is a cable like member.

4. A pipe handling device for use in combination with a drilling rig, which drilling rig has an upright tower with a traveling block, a swivel and a pipe rotating device depending therefrom, which pipe handling device comprises:
(a) a movable frame,
(b) an arm pivotally mounted on said movable frame,
(c) a supporting frame mounted on said arm,
(d) a pair of pipe engaging members pivotally mounted on said supporting frame, each having an outwardly extending arm,
(e) a fluid cylinder mounted on said movable frame,
(f) means interconnecting said fluid cylinder and said arm for moving said arm about the pivot of said pipe engaging members,
(g) a further fluid cylinder mounted on said supporting frame for movement with said arm,
(h) a plunger extending out of said last mentioned fluid cylinder,
(i) means operable by said plunger to engage a portion of each said pipe engaging member to move said pipe engaging members about said pivot to engage a pipe when said pipe is in one position and to release said pipe engaging members when said pipe is in another position.

5. A pipe handling device for use in combination with a drilling rig, which drilling rig has an upright tower with a traveling block, a swivel and a pipe rotating device depending therefrom, as defined in claim 4, wherein:
(a) said means operated by said plunger is a cam operatively associated with said supporting frame, the movement of which cam moves said pipe engaging members with relation to said pipe.

6. A pipe handling device for use in combination with a drilling rig, which drilling rig has an upright tower with a traveling block, a swivel and a pipe rotating device depending therefrom, as defined in claim 5, wherein:
(a) said cam is adapted to move between said outwardly extending arms on said pipe engaging members.

7. A pipe handling device for use in combination with a drilling rig, which drilling rig has an upright tower with a traveling block, a swivel and a pipe rotating device depending therefrom, as defined in claim 4, wherein:
(a) rollers are mounted on the ends of said outwardly extending arms of said pipe engaging members opposite said arcuate portion thereof, and
(b) a wedge shaped cam pivotally mounted on said supporting frame for movement between said rollers by said plunger of said further fluid actuated cylinder.

8. A pipe handling device for use in combination with a drilling rig, which drilling rig has an upright tower with a traveling block, a swivel and a pipe rotating device depending therefrom, as defined in claim 7, wherein:
(a) a transverse shaft is mounted in said supporting frame,
(b) said wedge-shaped cam being mounted on said transverse shaft so as to engage between said rollers upon said shaft being rotated by said plunger of said further fluid actuated cylinder to actuate said outwardly extending arms.

9. A pipe handling device for use in combination with a drilling rig, which drilling rig has an upright tower with a traveling block, a swivel and a pipe rotating device depending therefrom, which pipe handling device comprises:
(a) bracket means secured to and extending downward from the pipe rotating device,
(1) an arm pivotally mounted on said downwardly extending bracket means so as to be a spaced distance downward from the pipe rotating device,
(b) a support frame member mounted on said arm,
(c) a pair of complementary pipe engaging members pivotally mounted on said support frame member,
(d) a fluid cylinder mounted on said pipe rotating device,
(e) a plunger within said cylinder,
(1) pivot means interconnecting said plunger and said arm for moving said arm about the pivot thereof,
(f) a further fluid cylinder mounted on said support frame member for movement with said arm,
(g) a plunger extending out of said further fluid cylinder,
(h) cam means associated with said plunger of said further fluid cylinder and operable thereby to engage a portion of each said pipe engaging member to move said pipe engaging members about said pivot means so as to engage said pipe when said cam is in one position and to release said pipe engaging members when said cam is in another position.

10. A pipe handling device for use in combination with a drilling rig, which drilling rig has an upright tower with a traveling block, a swivel and a pipe rotating device depending therefrom, as defined in claim 9; wherein
(a) fastening means associated with said arm and with said support frame on which said complementary pipe engaging members are mounted to adjustably secure said pipe engaging members on said arm.

11. A pipe handling device for use in combination with a drilling rig, which drilling rig has an upright tower with a traveling block, a swivel and a pipe rotating device depending therefrom which pipe handling device comprises the structure as set forth in claim 9, and wherein
(a) an adjustable stop means is mounted on said arm and is engageable with said pipe rotating device to limit the movement of said arm in one direction.

12. A pipe handling device for use in combination with a drilling rig, which drilling rig has an upright tower with a traveling block and swivel, and a pipe rotating device depending therefrom, as defined in claim 9; wherein
(a) a shaft is mounted transversely of said supporting frame,
(b) a cam is fixedly secured to said shaft and is rotatable therewith,
(1) said complementary pipe engaging members each having a lever extending outwardly therefrom in the direction opposite from the pipe engaging portion of said respective members,
(2) said cam being adapted to engage said outwardly extending levers to move said complementary pipe engaging members into engagement with said pipe when said shaft and said cam are rotated in one direction and to move said cam out of engagement with said outwardly extending levers when said shaft and said cam are rotated in the opposite direction,
(3) lever means fixedly connected to said shaft and being rotatable therewith, and
(4) means pivotally connecting the plunger of said further fluid cylinder with said lever.

13. A pipe handling device for use in combination with a drilling rig, which drilling rig has an upright tower with a traveling block, a swivel and a pipe rotating device depending therefrom, as defined in claim 12; wherein
 (a) said cam is an arcuate wedge-like member.

References Cited by the Examiner
UNITED STATES PATENTS

| | | | |
|---|---|---|---|
| 2,439,714 | 4/1948 | Broers | 214—2.5 |
| 2,946,464 | 7/1960 | Guier | 214—2.5 |
| 3,061,011 | 10/1962 | Paget | 214—2.5 |
| 3,143,220 | 8/1964 | Goepfert | 214—2.5 |
| 3,181,630 | 5/1965 | Coburn | 173—164 |
| 3,212,593 | 10/1965 | Reischl | 214—2.5 |

FRED C. MATTERN, Jr., *Primary Examiner.*

L. P. KESSLER, *Assistant Examiner.*